(12) United States Patent
Wang et al.

(10) Patent No.: US 9,710,493 B2
(45) Date of Patent: Jul. 18, 2017

(54) APPROXIMATE K-MEANS VIA CLUSTER CLOSURES (71) Applicant: Microsoft Technology Licensing, LLC, Redmond, WA (US)

(72) Inventors: Jingdong Wang, Beijing (CN); Qifa Ke, Cupertino, CA (US); Shipeng Li, Palo Alto, CA (US); Jing Wang, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 105 days.

(21) Appl. No.: 13/791,666

(22) Filed: Mar. 8, 2013

(65) Prior Publication Data

US 2014/0258295 A1 Sep. 11, 2014

(51) Int. Cl.
G06F 17/30 (2006.01)

(52) U.S. Cl.
CPC .. G06F 17/30256 (2013.01); G06F 17/30705 (2013.01)

(58) Field of Classification Search
USPC .................................................. 707/737–740
See application file for complete search history.

(56) References Cited

U.S. PATENT DOCUMENTS

| 5,583,949 | A | 12/1996 | Smith et al. |
| 7,519,200 | B2 | 4/2009 | Gokturk et al. |
| 7,640,219 | B2 | 12/2009 | Perrizo |
| 7,659,894 | B2 | 2/2010 | Keller et al. |
| 7,933,915 | B2 | 4/2011 | Singh et al. |
| 7,940,985 | B2 | 5/2011 | Sun et al. |
| 7,966,327 | B2 | 6/2011 | Li et al. |
| 8,165,407 | B1 | 4/2012 | Khosla et al. |
| 8,229,876 | B2 * | 7/2012 | Roychowdhury ... G06K 9/6223 706/54 |
| 8,363,939 | B1 | 1/2013 | Khosla et al. |
| 8,385,662 | B1 * | 2/2013 | Yoon et al. .................. 382/225 |
| 8,687,887 | B2 | 4/2014 | Norimatsu et al. |
| 8,745,074 | B1 * | 6/2014 | Covell ............. G06F 17/30867 707/758 |
| 2002/0081033 | A1 | 6/2002 | Stentiford |
| 2002/0164074 | A1 | 11/2002 | Matsugu et al. |
| 2007/0003138 | A1 | 1/2007 | Hobson et al. |
| 2007/0160274 | A1 | 7/2007 | Mashiach |

(Continued)

OTHER PUBLICATIONS

Final Office Action for U.S. Appl. No. 13/403,747, mailed on Dec. 17, 2013, Jingdong Wang, "Salient Object Segmentation", 16 pages.

(Continued)

*Primary Examiner* — Michelle Owyang
(74) *Attorney, Agent, or Firm* — Lee & Hayes, PLLC (57) ABSTRACT

A set of data points is divided into a plurality of subsets of data points. A set of cluster closures is generated based at least in part on the subset of data points. Each cluster closure envelopes a corresponding cluster of a set of clusters and is comprised of data points of the enveloped cluster and data points neighboring the enveloped cluster. A k-Means approximator iteratively assigns data points to a cluster of the set of clusters and updates a set of cluster centroids corresponding to the set of clusters. The k-Means approximator assigns data points based at least in part on the set of cluster closures.

19 Claims, 6 Drawing Sheets

(56) References Cited

U.S. PATENT DOCUMENTS

| | | | | |
|---|---|---|---|---|
| 2007/0244843 | A1* | 10/2007 | Bougaev et al. | 706/46 |
| 2007/0297651 | A1 | 12/2007 | Schubert | |
| 2008/0270374 | A1* | 10/2008 | Li et al. | 707/5 |
| 2008/0304740 | A1 | 12/2008 | Sun et al. | |
| 2009/0043797 | A1* | 2/2009 | Dorie | G06F 17/3071 |
| 2009/0245638 | A1 | 10/2009 | Collier et al. | |
| 2010/0014741 | A1* | 1/2010 | Banville | G06K 9/6253 382/133 |
| 2010/0106713 | A1 | 4/2010 | Esuli et al. | |
| 2010/0119147 | A1 | 5/2010 | Blake et al. | |
| 2010/0124375 | A1 | 5/2010 | Wu et al. | |
| 2010/0145961 | A1* | 6/2010 | Hu et al. | 707/758 |
| 2010/0293206 | A1 | 11/2010 | Ylonen | |
| 2011/0058733 | A1 | 3/2011 | Inoue et al. | |
| 2011/0075927 | A1 | 3/2011 | Xu et al. | |
| 2012/0036132 | A1* | 2/2012 | Doyle | 707/738 |
| 2012/0054184 | A1* | 3/2012 | Masud et al. | 707/737 |
| 2012/0054238 | A1* | 3/2012 | Lee et al. | 707/771 |
| 2012/0233188 | A1* | 9/2012 | Majumdar | 707/756 |
| 2012/0251007 | A1* | 10/2012 | Yang et al. | 382/190 |
| 2012/0259850 | A1 | 10/2012 | Liu et al. | |
| 2012/0268612 | A1 | 10/2012 | Wang et al. | |
| 2012/0275701 | A1 | 11/2012 | Park et al. | |
| 2013/0051658 | A1* | 2/2013 | Hwang | G06K 9/00201 382/154 |
| 2013/0132402 | A1 | 5/2013 | Yang et al. | |
| 2014/0016895 | A1 | 1/2014 | Capasso et al. | |

OTHER PUBLICATIONS

Office action for U.S. Appl. No. 13/411,213, mailed on Nov. 6, 2013, Wang, et al., "Image Searching by Approximate k-NN Graph", 11 pages.

Boutsidis, et al., "Random Projections for k-Means Clustering", In Proceedings of Advances in Neural Information Processing Systems, Dec. 2010, 9 pages.

Chum, et al., "Large-Scale Discovery of Spatially Related Images", In Proceedings of IEEE Transactions on Pattern Analysis and Machine Intelligence, vol. 32, Issue 2, Feb. 2010, 8 pages.

Davidson, et al., "A Survey of Clustering with Instance Level Constraints", In Proceedings of ACM Transactions on Knowledge Discovery from Data, Mar. 2007, 41 pages.

Elkan, Charles, "Using the Triangle Inequality to Accelerate k-Means", In Proceedings of the Twentieth International Conference on Machine Learning, Aug. 21, 2003, 7 pages.

Fei-Fei, et al., "Learning Generative Visual Models from Few Training Examples: An Incremental Bayesian Approach Tested on 101 Object Categories", In Proceedings of Computer Vision and Pattern Recognition Workshop, Jun. 27, 2004, 9 pages.

Fern, et al., "Random Projection for High Dimensional Data Clustering: A Cluster Ensemble Approach", In Proceedings of the Twentieth International Conference on Machine Learning, Aug. 21, 2003, 8 pages.

Frahling et al, "A Fast k-means Implementation Using Coresets", Int. Journal of Computational Geometry and Appl, Dec. 2008, 18(6), 10 pgs.

Jegou, et al., "Product Quantization for Nearest Neighbor Search", In Proceedings of IEEE Transactions on Pattern Analysis and Machine Intelligence, vol. 33, Issue 1, Jan. 2011, 12 pages.

Kanungo, et al., "An Efficient k-Means Clustering Algorithm: Analysis and Implementation", In Proceedings of IEEE Transactions on Pattern Analysis and Machine Intelligence, vol. 24, Issue 7, Jul. 2002, 12 pages.

Li et al, "Large Scale Robust Visual Codebook Construction", ACM Multimedia, Oct. 2010, 4 pgs.

Li, et al., "Modeling and Recognition of Landmark Image Collections using Iconic Scene Graphs", In Proceedings of the 10th European Conference on Computer Vision, Oct. 12, 2008, 14 pages.

Lloyd, Stuart P., "Least Squares Quantization in PCM", In Proceedings of IEEE Transactions on Information Theory, vol. 28, Issue 2, Mar. 1982, 9 pages.

MacQueen, J., "Some Methods for Classification and Analysis of Multivariate Observations", In Proceedings of the Fifth Berkeley Symposium on Mathematical Statistics and Probability, vol. 1, Nov. 23, 2012, 17 pages.

Mahajana, et al., "The Planar k Means Problem is NP-Hard", In Proceedings of the 3rd International Workshop on Algorithms and Computation, Feb. 18, 2009, 15 pages.

McCallum, et al., "Efficient Clustering of High-Dimensional Data Sets with Application to Reference Matching", In Proceedings of the Sixth ACM SIGKDD International Conference on Knowledge Discovery and Data Mining, Aug. 20, 2000, 10 pages.

Muja, et al., "Fast Approximate Nearest Neighbors with Automatic Algorithm Configuration", In Proceedings of the Fourth International Conference on Computer Vision Theory and Applications, vol. 1, Feb. 5, 2009, 10 pages.

Nister, et al., "Scalable Recognition with a Vocabulary Tree", In Proceedings of IEEE Computer Society Conference on Computer Vision and Pattern Recognition, Jun. 17, 2006, 8 pages.

Philbin, et al., "Object Mining Using a Matching Graph on Very Large Image Collections", In Proceedings of the Sixth Indian Conference on Computer Vision, Graphics & Image Processing, Dec. 17, 2008, 8 pages.

Philbin, et al., "Object Retrieval with Large Vocabularies and Fast Spatial Matching", In Proceedings of IEEE Computer Society Conference on Computer Vision and Pattern Recognition, Jun. 18, 2007, 8 pages.

Raguram, et al., "Modeling and Recognition of Landmark Image Collections Using Iconic Scene Graphs", In International Journal of Computer Vision, vol. 95, Issue 3, Dec. 16, 2011, 28 pages.

Sculley, D., "Web-Scale k-Means Clustering", In Proceedings of the 19th International Conference on World Wide Web, Apr. 26, 2010, 2 pages.

Simon, et al., "Scene Summarization for Online Image Collections", In Proceedings of IEEE 11th International Conference on Computer Vision, Oct. 14, 2007, 8 pages.

Sivic, et al., "Video Google: A Text Retrieval Approach to Object Matching in Videos", In Proceedings of the Ninth IEEE International Conference on Computer Vision, Oct. 13, 2003, 8 pages.

Steinbach, et al., "The Challenges of Clustering High Dimensional Data", In Proceedings of New Vistas in Statistical Physics: Applications in Econophysics, Bioinformatics, and Pattern Recognition, Nov. 22, 2012, 33 pages.

Torralba, et al., "80 Million Tiny Images: A Large Data Set for Nonparametric Object and Scene Recognition", In Proceedings of IEEE Transactions on Pattern Analysis and Machine Intelligence, vol. 30, Issue 11, Nov. 2008, 12 pages.

Verma, et al., "Which Spatial Partition Trees are Adaptive to Intrinsic Dimension?", In Proceedings of the Twenty-Fifth Conference on Uncertainty in Artificial Intelligence, Jun. 18, 2009, 10 pages.

Xiong, et al., "Spectral Active Clustering via Purification of the k-Nearest Neighbor Graph", In Proceedings of the European Conference on Data Mining, Jul. 21, 2012, 9 pages.

Yan, et al., "Pairwise Constrained Clustering for Sparse and High Dimensional Feature Spaces", In Proceedings of the 13th Pacific-Asia Conference on Advances in Knowledge Discovery and Data Mining, May 29, 2009, 8 pages.

U.S. Appl. No. 13/545,253, Wang, et al., "Salient Object Segmentation", filed Jul. 10, 2012.

Achanta, et al., "Frequency-tuned Salient Region Detection", In Proceedings of IEEE Computer Society Conference on Computer Vision and Pattern Recognition, Jun. 20, 2009, 8 pages.

Alexe, et al., "What is an Object?", In Proceedings of 23rd IEEE Conference on Computer Vision and Pattern Recognition, Jun. 13, 2010, 8 pages.

Arya, et al., "Approximate Nearest Neighbor Queries in Fixed Dimensions", SODA 1993 Proc of 4th Annual ACM-SIAM Symposium on Discrete Algorithms, Jan. 1993, 10 pages.

Avidan, et al., "Seam Carving for Content-Aware Image Resizing", Journal, ACM Transactions on Graphics, SIGGRAPH, vol. 26, Issue 3, Jul. 2007, 9 pages.

(56) References Cited

OTHER PUBLICATIONS

Belkin, et al., "Laplacian Eigenmaps for Dimensionality Reduction and Data Representation", Neural Computation, vol. 15, No. 6, Jun. 2003, 25 pgs.
Bentley, "Multidimensional Binary Search Trees Used for Associative Searching", Communications of the ACM, vol. 18, No. 9, Sep. 1975, pp. 509-517.
Bentley, "Multidimensional Divide-and-Conquer", Communications of the ACM, vol. 23, No. 4, Apr. 1980, pp. 214-229.
Bentley, et al., "The Complexity of Finding Fixed-radius Near Neighbors", Information Processing Letters, vol. 6, No. 6, Dec. 1977, pp. 209-212.
Bhattacharya, et al., "A Framework for Photo-Quality Assessment and Enhancement based on Visual Aesthetics", ACM Multimedia, Oct. 2010, 10 pgs.
Blaschko, et al., "Learning to Localize Objects with Structured Output Regression", In Proceedings of the 10th European Conference on Computer Vision: Part I, Oct. 12, 2008, 14 pages.
Borenstein, et al., "Shape Guided Object Segmentation", In Proceedings of the IEEE Computer Society Conference on Computer Vision and Pattern Recognition, vol. 1, Jun. 22, 2006, pp. 969-976.
Boykov, et al., "An Experimental Comparison of Min-Cut/Max-Flow Algorithms for Energy Minimization in Vision", In IEEE Transactions on PAMI, vol. 26, no. 9, pp. 1124-1137, Sep. 2004.
Boykov, et al. "Interactive Graph Cuts for Optimal Boundary and Region Segmentation of Objects in N-D Images", Proceedings of Intl Conference on Computer Vision, Jul. 2001, 8 pages.
Breiman, Leo, "Random Forests", In Journal of Machine Language, vol. 45, Issue 1, Oct. 1, 2001, 28 pages.
Chapelle, et al., "Semi-Supervised Classification by Low Density Separation", Proceedings of the 10th International Workshop on Artificial Intelligence and Statistics, Jan. 2005, pp. 57-64.
Chen, et al., "A Visual Attention Model for Adapting Images on Small Displays", In Journal of Multimedia Systems, vol. 9, No. 4, Oct. 2003, 12 pages.
Chen, et al., "Fast Approximate kNN Graph Construction for High Dimensional Data via Recursive Lanczos Bisection", Journal of Machine Learning Research, vol. 10, Sep. 2009, pp. 1989-2012.
Chen, et al., "Using Random Forest to Learn Imbalanced Data", In Technical Report of Statistics Department, University of California, Berkeley, Jul. 2004, 12 pages.
Cheng, et al., "Global Contrast Based Salient Region Detection", In Proceedings of the IEEE Conference on Computer Vision and Pattern Recognition, Jun. 20, 2011, 8 pages.
Clarkson, "Fast Algorithms for the All Nearest Neighbors Problem", Proceedings of the 24th Annual Symposium on Foundations of Computer Science, Nov. 1983, pp. 226-232.
Connor, et al., "Fast Construction of k-Nearest Neighbor Graphs for Point Clouds", IEEE Transactions on Visivalization and Computer Graphics, vol. 16, No. 4, Jul. and Aug. 2010, pp. 599-608.
Dalal, et al., "Histograms of Oriented Gradients for Human Detection", In Proceedings of the IEEE Computer Society Conference on Computer Vision and Pattern Recognition, Jun. 25, 2005, 8 pages.
Dasgupta, et al., "Random projection trees and low dimensional manifolds", Proceedings of the 40th Annual ACM Symposium on Theory of Computing, May 2008, pp. 537-546.
Datar, et al., "Locality-Sensitive Hashing Scheme Based on p-Stable Distributions", Symposium on Computational Geometry, Jun. 2004, pp. 253-262.
Datta, et al., "Studying Aesthetics in Photographic Images Using a Computational Approach", In ECCV 2006 Proc of 9th European Conf on Computer Vision, May 2006, pp. 288-301.
Felzenszwalb, et al., "Distance Transforms of Sampled Functions", Cornell Computing and Information Science Techical Report 2004-1963, 2004, 15 pages.
Felzenszwalb, et al., "Efficient Graph-Based Image Segmentation", International Journal of Computer Vision, 59(2), Sep. 2004, pp. 167-181.

Feng, et al., "Salient Object Detection by Composition", In IEEE International Conference on Computer Vision, Nov. 6, 2011, 8 pages.
Friedman, et al., "An Algorithm for Finding Best Matches in Logarithmic Expected Time", ACM Transactions on Mathemahcal Software, vol. 3, No. 3, Sep. 1977, pp. 209-226.
Ge, et al., "Image-Segmentation Evaluation From the Perspective of Salient Object Extraction", In Proceedings of the IEEE Computer Society Conference on Computer Vision and Pattern Recognition, Jun. 22, 2006, pp. 1146-1153.
Girshick, et al., "Efficient Regression of General-Activity Human Poses from Depth Images", In Proceedings of the 13th International Conference on Computer Vision, Nov. 6, 2011, 8 pages.
Goferman, et al., "Context-Aware Saliency Detection", In Proceedings of Twenty-Third IEEE Conference on Computer Vision and Pattern Recognition, Jun. 13, 2010, 8 pages.
Gopalakrishnan, et al., "Random Walks on Graphs for Salient Object Detection in Images", In IEEE Transactions on Image Processing, vol. 19, Issue 12, Dec. 2010, 11 pages.
Hacid, et al., "Incremental Neighborhood Graphs Construction for Multidimensional Databases Indexing", Proceedings of the 20th conference of the Canadian Society for Computational Studies of Intelligence on Advances in Artificial Intelligence, May 2007, pp. 405-416.
Hou, et al., "Saliency Detection: A Spectral Residual Approach", CVPR, IEEE Computer Vision and Pattern Recognition, Jun. 2007, 8 pages.
Hou, et al., "Thumbnail Generation Based on Global Saliency", In 1st International Conference on Cognitive Neurodynamics, Nov. 17, 2007, 5 pages.
Itti, et al., "A Model of Saliency-Based Visual Attention for Rapid Scene Analysis", In IEEE Transactions Pattern Analysis Machine Intelligence, vol. 20, Issue 11, Nov. 1998, 6 pages.
Jiang, et al., "Automatic Salient Object Segmentation Based on Context and Shape Prior", In Proceedings of the 22nd British Machine Vision Conference, Aug. 29, 2011, 12 pages.
Judd, et al., "Learning to Predict Where Humans Look", In Proceedings of IEEE International Conference on Computer Vision, Sep. 27, 2009, 8 pages.
Kadir, et al., "Saliency, Scale and Image Description", In International Journal of Computer Vision, vol. 45, Issue 2, Jun. 2001, 23 pages.
Kolmogorov, "What Energy Functions Can Be Minimized via Graph Cuts?", IEEE Transactions on Pattern Analysis and Machine Intelligence, vol. 26, No. 2, Feb. 2004, 13 pages.
Kovesi, "MATLAB and Octave Functions for Computer Vision and Image Processing", DICTA 2012, DigitalImage Computing: Techniquies and Applications, Dec. 2012, 16 pages.
Kulis, "Kernelized Locality-Sensitive Hashing for Scalable Image Search", Computer Vision, 2009 IEEE 12th International Conference, Oct. 2009, 8 pages.
Kumar, et al., "What Is a Good Nearest Neighbors Algorithm for Finding Similar Patches in Images?", ECCV 2008 Proceedings of the 10th European Conference on Computer Vision: Part II, Oct. 2008, 15 pages.
Lanczos, "An Iteration Method for the Solution of the Eigenvalue Problem of Linear Differential and Integral Operators", Journal of Research of the National Bureau of Standards, vol. 45, No. 4, Oct. 1950, pp. 255-282.
Li, et al., "Lazy Snapping", Proc ACM SIGGRAPH 2004, ACM Transactions on Graphics, vol. 23, Issue 3, Aug. 2004, pp. 303-308.
Liu, et al., "An Improved Image Segmentation Algorithm for SalientObject Detection", In Proceedings of 23rd International Conference Image and Vision Computing, Nov. 28, 2008, 6 pages.
Liu, et al., "An Investigation of Practical Approximate Nearest Neighbor Algorithms", Proceedings of Advances in Neural Information Processing Systems, Dec. 2004, pp. 825-832.
Liu, et al., "Learning to Detect a Salient Object", In Journal of IEEE Transactions on Pattern Analysis and Machine Intelligence, vol. 33, Issue 2, Feb. 2011, 15 pages.
Office action for U.S. Appl. No. 13/403,747, mailed on Jul. 25, 2013, Jingdong Wang et al, "Salient Object Segmentation", 11 pages.

(56) References Cited

OTHER PUBLICATIONS

Office Action for U.S. Appl. No. 13/794,427, mailed on Aug. 14, 2014, Wang et al., "Salient Object Detection in Images via Saliency", 10 pages.
Office Action for U.S. Appl. No. 13/403,747, mailed on Sep. 17, 2014, Jingdong Wang, "Salient Object Segmentation", 18 pages.
Liu, et al., "Region Enhanced Scale-invariant Saliency Detection", Proc 2006 IEEE Intl Conf on Multimedia and Expo, Jul. 2006, pp. 1477-1480.
Luo, et al., "Photo and Video Quality Evaluation: Focusing on the Subject", In ECCV, Part III, Proc 10th European Conf on Computer Vision, Oct. 2008, pp. 386-399.
Luo, et al., "Saliency Density Maximization for Object Detection and Localization", In Proceedings of the 10th Asian conference on Computer Vision—vol. Part III, Nov. 8, 2010, 12 pages.
Ma et al, "Contrast-based Image Attention Analysis by Using Fuzzy Growing," Proc 11 ACM Intl Conf on Multimedia, Nov. 2-8, 2003, pp. 374-381.
Mahamud, et al., "Segmentation of Multiple Salient Closed Contours from Real Images", In Proceedings of the IEEE Transactions on Pattern Analysis and Machine Intelligence, vol. 25, No. 4, Apr. 2003, pp. 433-444.
Maier, et al., "Cluster Identification in Nearest-Neighbor Graphs", Proceedings of the 18th International Confererence on Algorithmic Learning Theory, May 2007, pp. 196-210.
Marchesotti, et al., "A Framework for Visual Saliency Detection with Applications to Image Thumbnailing", In IEEE 12th International Conference on Computer Vision, Sep. 29, 2009, 8 pages.
Martin, et al., "Learning to Detect Natural Image Boundaries Using Local Brightness, Color, and Texture Cues", IEEE Transactions on Pattern Analysis and Machine Intelligence, May 2004, 20 pages.
Oliva, et al., "Modeling the Shape of the Scene: A Holistic Representation of the Spatial Envelope", In International Journal of Computer Vision, vol. 42, Issue 3, Jan. 2001, 31 pages.
Paredes, et al., "Practical Construction of k-Nearest Neighbor Graphs in Metric Spaces", Proc 5th Intl Conf on Experimental Algorithms, May 2006, pp. 85-97.
Pauly, et al., "Fast Multiple Organ Detection and Localization in Whole-Body MR Dixon Sequences", In Proceedings of the 14th International Conference on Medical Image Computing and Computer-Assisted Intervention—vol. Part III, Sep. 18, 2011, 8 pages.
Rahtu, et al., "Learning Category Independent Object Detection Cascade", In Proceedings of the 13th International Conference on Computer Vision, Nov. 6, 2011, 8 pages.
Rother, et al., "GrabCut—Interactive Foreground Extraction using Iterated Graph Cuts", In Journal of ACM Transactions on Graphics, vol. 23, Issue 3, Aug. 2004, 6 pages.
Roweis, et al., "Nonlinear Dimensionality Reduction by Locally Linear Embedding", Science, vol. 290, Dec. 2000, pp. 2323-2326.
Rutishauser, et al., "Is Bottom-up Attention Useful for Object Recognition?", In IEEE Conference on Computer Vision and Pattern Recognition, Jun. and Jul. 2004, 8 pages.
Santella, et al., "Gaze-Based Interaction for Semi-Automatic Photo Cropping", In Proceedings of the SIGCHI Conference on Human Factors in Computing Systems, Apr. 22, 2006, 10 pages.
Sebastian, et al., "Metric-based Shape Retrieval in Large Databases", Proceedings of the 16th International Conference on Pattern Recognition Aug. 2002, pp. 291-296.
Shotton, et al., "Real-Time Human Pose Recognition in Parts from Single Depth Images", In Proceedings of the IEEE Conference on Computer Vision and Pattern Recognition, Jun. 20, 2011, 8 pages.
Silpa-Anan, et al., "Optimised KD-trees for Fast Image Descriptor Matching", IEEE Conference on Computer Vision and Pattern Recognition, Jun. 2008, 8 pages.
Silva, et al., "Multi-Scale Spectral Residual Analysis to Speed up Image Object Detection", In Conference on Graphics, Patterns and Images, Aug. 22, 2012, 8 pages.
Stahl, et al., "Edge Grouping Combining Boundary and Region Information", IEEE Transactions on Image Processing, vol. 16, No. 10, Oct. 2007, 17 pages.
Tenenbaum, et al., "Global Geometric Framework for Nonlinear Dimensionality Reduction", Science, vol. 290, Dec. 2000, pp. 2319-2323.
Tu, et al., "Auto-Context and Its Application to High-Level Vision Tasks and 3D Brain Image Segmentation", In IEEE Transactions on Pattern Analysis and Machine Intelligence, vol. 32, No. 10, Oct. 2010, 14 pages.
Uno, et al., "Efficient Construction of Neighborhood Graphs by the Multiple Sorting Method", CoRR, The Computing Research Repository, vol. 904, Apr. 2009, 15 pages.
Vaidya, "An O(n log n) Algorithm for the All-Nearest-Neighbors Problem", Journal of Discrete & Computational Geometry, vol. 4, No. 2, Jan. 1989, pp. 101-115.
Veksler, "Star Shape Prior for Graph-Cut Image Segmentation", In Proceedings of the 10th European Conference on Computer Vision: Part III, ECCV 08, Oct. 2008, 15 pages.
Vicente, et al., "Graph Cut Based Image Segmentation with Connectivity Priors", Computer Vision and Pattern Recognition, IEEE Computer Society Conference, Jun. 2008, 8 pages.
Virmajoki, et al., "Divide-and-Conquer Algorithm for Creating Neighborhood Graph for Clustering", Proceedings of the 17th International Conference on Pattern Recognition, Aug. 2004, 4 pages.
Wang, et al., "Automatic Salient Object Extraction with Contextual Cue", In Proceedings of the 13th International Conference on Computer Vision, Nov. 6, 2011, 8 pages.
Wang, et al., "Picture Collage", In Proceedings of the IEEE Computer Society Conference on Computer Vision and Pattern Recognition, Jun. 17, 2006, 8 pages.
Wang, et al., "Salient Closed Boundary Extraction with Ratio Contour", IEEE Transactions on Pattern Analysis and Machine Intelligence, vol. 27, No. 4, Apr. 2005, 16 pages.
Wang, et al., "Simulating Human Saccadic Scanpaths on Natural Images", In Proceedings of the IEEE Conference on Computer Vision and Pattern Recognition, Jun. 20, 2011, 8 pages.
Xue, et al., "Proto-Object Based Rate Control for JPEG2000: An Approach to Content-Based Scalability", IEEE Transactions on Image Processing, vol. 20, No. 4, Apr. 2011, 8 pages.
Yianilos, "Data Structures and Algorithms for Nearest Neighbor Search in General Metric Spaces", Proceedings of the 4th annual ACM-SIAM Symposium on Discrete Algorithms, Jan. 1993, pp. 311-321.
Zhang, et al., "An Adaptive Computational Model for Salient Object Detection", In IEEE Transactions on Multimedia, vol. 12, Issue 4, Jun. 2010, 17 pages.
Zhang, et al., "Free-Shape Subwindow Search for Object Localization", IEEE Conf on Computer Vision and Pattern Recognition, Jun. 2010, 8 pages.
Zhou, et al., "Ranking on Data Manifolds", Proceedings of 16th Advances in Neural Information Processing Systems, Jun. 2003, 8 pages.
Zhu, "Semi-Supervised Learning Literature Survey", Computer Sciences Technical Report 1530, University of Wisconsin, Madison, Jun. 2007, last modified Dec. 2006, 52 pages.
Office action for U.S. Appl. No. 13/794,427, mailed on Mar. 2, 2015, Wang, et al, "Salient Object Detection in Images via Saliency", 10 pages.
Chen, et al., "Fast Approximate kNN Graph Construction for High Dimensional Data via Recursive Lanczos Bisection", University of Minnesota, Oct. 2, 2008, pp. 1-20.
Chen, et al., "Fast Approximate kNN Graph Construction for High Dimensional Data via Recursive Lanczos Bisection", <<http://www.mcs.anl.gov/jiechen/pub/divide_and_conquer_knn.pdf>>, Journal of Machine Learning Research, vol. 10, Sep. 2009, pp. 1989-2012.
Office action for U.S. Appl. No. 13/794,427, mailed on Jun. 19, 2015, Wang et al., "Salient Object Detection in Images via Saliency", 12 pages.
Liu et al., "Learning to Detect a Salient Object," IEEE Transactions on Ptter Anazlysis and Machine Intelligence, vol. 33, No. 2, Feb. 2011, 15 pages.

\* cited by examiner

APPROXIMATE K-MEANS VIA CLUSTER CLOSURES

BACKGROUND

The increasing popularity of image applications enable users to leverage use of cameras in mobile devices when performing some tasks. An image application may enable users to capture images on cameras of their mobile devices, which the image application can then submit as queries to perform a search. Typically, the image application evaluates candidate images that are similar to the query submitted to retrieve images that are relevant to the query.

An image may be represented by a vector such as that employed in a bag-of-features model (BoF model) in which image features may be treated analogously as words in a document. In document classification, a bag of words is a sparse vector of occurrence counts of words; that is, a sparse histogram over the vocabulary. In computer vision, a bag of visual words is a sparse vector of occurrence counts of a vocabulary of local image features.

To achieve this, the features of an image are detected. After feature detection, an image is abstracted by several local patches. Feature representation methods deal with how to represent the patches as numerical vectors. These vectors are called feature descriptors. One of the most famous descriptors is Scale-invariant feature transform (SIFT). SIFT converts each patch to 128-dimensional vector. After this step, the image is a collection of vectors of the same dimension (128 for SIFT), where the order of different vectors is of no importance. The final step for the BoF model is to convert vector represented patches to "codewords" (analogy to words in text documents), which also produces a "codebook" (analogous to a word dictionary). A codeword can be considered as a representative of several similar patches. Codewords are then defined as the centers of the learned clusters. The number of the clusters is the codebook size (analogous to the size of the word dictionary).

K-means has been widely used in computer vision and machine learning for clustering and vector quantization. In image retrieval and recognition, it is often used to learn the codebook for the popular bag-of-features model.

The standard k-Means algorithm, Lloyd's algorithm, is an iterative refinement approach that greedily minimizes the sum of squared distances between each point and its assigned cluster center. It consists of two iterative steps, the assignment and update step. The assignment step aims to find the nearest cluster for each point by checking the distance between the point and each cluster center; the update step updates the cluster centers based on current assignment. When clustering n points into k clusters, the assignment step costs O(nk). For applications with large nk, the assignment step in exact k-Means becomes prohibitively expensive.

In large-scale image retrieval, it is advantageous to learn a large codebook containing one million or more entries, which requires clustering tens or even hundreds of millions of high-dimensional feature descriptors into one million or more clusters. Another emerging application of large-scale clustering is to organize a large corpus of web images for various purposes such as web image browsing/exploring. Thus, efficient clustering of large data sets is desired.

SUMMARY

This disclosure describes techniques for efficient clustering of data sets. An approximate k-Means algorithm is implemented, which like the conventional k-Means algorithm, is an iterative algorithm. The approximate k-Means algorithm includes: initializing a data set by, among other things, randomly assigning data points to a set of k cluster centroids, $C=\{c_1, c_2, c_3, \ldots c_k\}$, or randomly generating a set of k cluster centroids and by creating a cluster closure around each of cluster centroid of a set of cluster centroids; and iteratively (i) assigning each data point of the data set to a cluster centroid of a cluster closure containing the data point and (ii) updating the data points in each cluster and calculating a new cluster centroid for each cluster closure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

This disclosure describes techniques for performing efficient data clustering via a k-Means approximation for, among other things, generating a codebook that represents the data set. While this disclosure discusses applying k-Means approximation to data sets representing images, such discussion is provided as one, non-limiting, example of a data set for which clustering may be applicable. Other data sets, including data sets representing documents, may also be clustered by techniques and processes discussed herein and are covered by this disclosure.

A codebook may be used for searches on image collections, data collections that are large scale and located on the World Wide Web, databases, and/or directories. In an implementation, a user may provide an image as a query, and then a process uses the codebook to search for images that are similar in appearance to the image query. Details of a process for clustering data points via a k-Means approximation and for creating the codebook is described below. The codebook may be implemented in providing search results.

For example, envision that the user takes a photograph of house style "A," such as a Cape Cod style house. The house is located in a community, in which the user desires to locate more houses that are similar in appearance to house style "A." The user submits the photograph as an image query to a search engine. The search engine extracts features from the image and utilizes the codebook to locate images that are similar in appearance to house style "A." The user may request the search for many reasons such as to determine possible paint colors on the house style; to determine different types of roof styles; to determine various styles of shutters, doors and window frames, and the like. The process performs the searches by looking for similar images on the World Wide Web, databases, directories, servers, blogs, websites, and the like. The search results may be ranked based on similarity to the image query. In yet other examples, the searches may be used in a variety of other applications, such as object classification, feature matching, content-based retrieval, and the like.

An approximate k-Means algorithm gathers a set of n data points $\{x_1, x_2, x_3, \ldots x_n\}$, where each data point (x) is a d-dimensional vector, into k groups (or clusters), $G=\{G_1, G_2, G_3, \ldots G_k\}$, where k is less than or equal to n, by minimizing the within-cluster sum of squared distortions:

$$J(C,G) = \sum_{j=1}^{k} \sum_{x_i \in G_j} \|x_i - c_j\|_2^2, \quad (1)$$

where $c_j$ is the centroid of cluster $G_j$, $$c_j = \frac{1}{|G_j|} \sum_{x_i \in G_j} x_i, \quad (2)$$

and $$C = \{c_1, c_2, c_3, \ldots c_k\}.$$

To create a cluster closure, a process identifies "active points," which are defined as data points that are within a threshold distance of a boundary between two clusters. A cluster closure (G) is defined as:

$$\overline{G} = U_{x \in G} N_x, \quad (3)$$

where x is a given data point that is an element of cluster G and $N_x$ denotes data points that are in the neighborhood of the given data point x. Implementations of cluster closure are described by Jing Wang, Jingdong Wang, Qifa Ke, Gang Zeng, and Shipeng Li, CVPR '12 Proceedings of the 2012 IEEE Conference on Computer Vision and Pattern Recognition (CVPR), 3037-3044, which is incorporated herein in its entirety by reference.

In some implementations, the neighborhood $N_x$ of a given data point may be determined via an ensemble approach using one or more random spatial partitions.

While aspects of described techniques can be implemented in any number of different computing systems, environments, and/or configurations, implementations are described in the context of the following example computing environment.

Illustrative Environment

Figure 1:
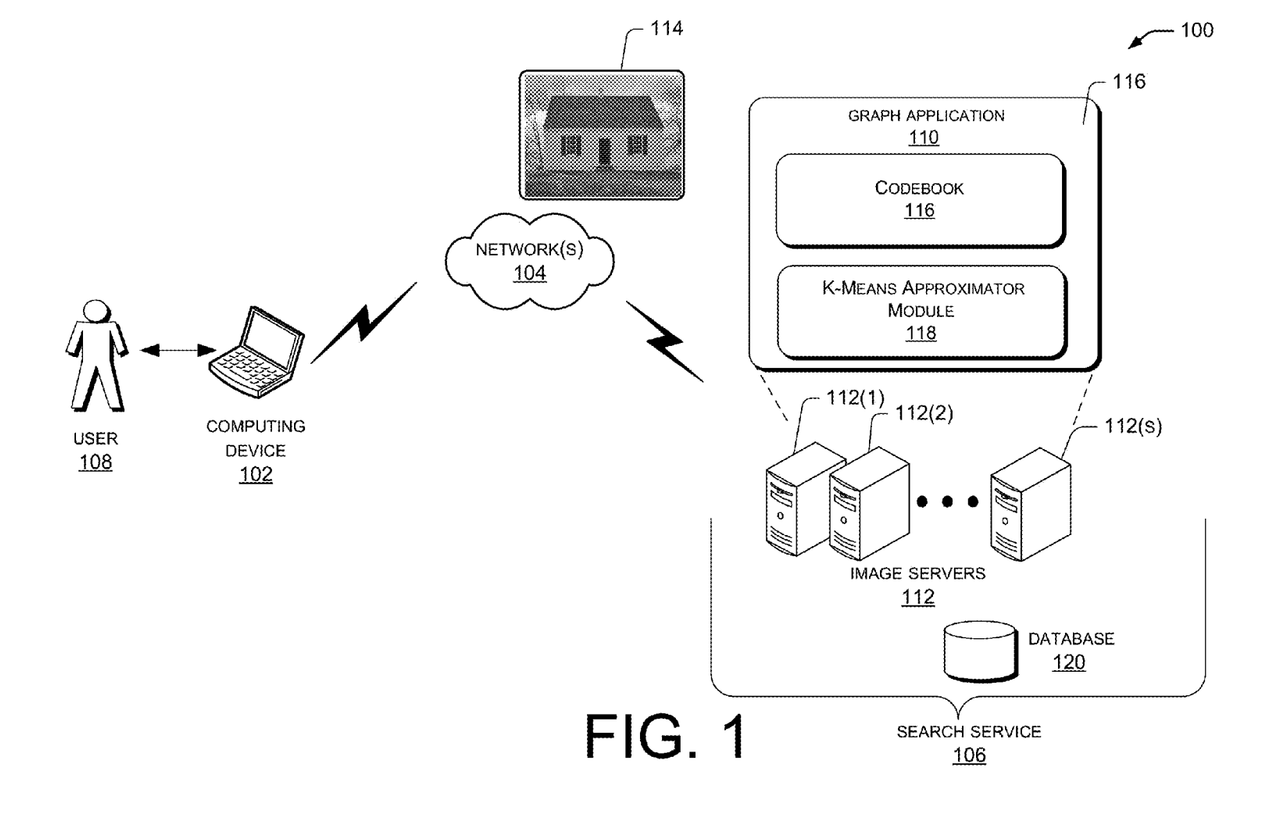
FIG. 1 illustrates an architecture to support an example environment to perform an image search by using an approximate k-Means algorithm to cluster datasets.

FIG. 1 illustrates an example architectural environment 100, in which efficient searches, performed on a computing device, may occur by employing the approximate k-Means algorithm to cluster datasets representing images to generate a codebook. The environment 100 includes an example computing device 102, which is illustrated as a laptop computer. The computing device 102 is configured to connect via one or more network(s) 104 to access a search service 106 for a user 108. It is noted that the computing device 102 may take a variety of forms, including, but not limited to, a portable handheld computing device (e.g., a personal digital assistant, a smart phone, a cellular phone), a tablet, a personal navigation device, a desktop computer, a portable media player, or any other device capable of connecting to one or more network(s) 104 to access the search service 106 for the user 108.

The computing device 102 may have additional features and/or functionality. For example, the computing device 102 may also include additional data storage devices (removable and/or non-removable) such as, for example, magnetic disks, optical disks, or tape. Such additional storage may include removable storage and/or non-removable storage. Computer-readable media may include, at least, two types of computer-readable media, namely computer storage media and communication media. Computer storage media may include volatile and non-volatile, removable, and non-removable media implemented in any method or technology for storage of information, such as computer readable instructions, data structures, program modules, or other data. A system memory, the removable storage and the non-removable storage are all examples of computer storage media. Computer storage media includes, but is not limited to, RAM, ROM, EEPROM, flash memory or other memory technology, CD-ROM, digital versatile disks (DVD), or other optical storage, magnetic cassettes, magnetic tape, magnetic disk storage or other magnetic storage devices, or any other non-transmission medium that can be used to store the desired information and which can be accessed by the computing device 102. Any such computer storage media may be part of the computing device 102. Moreover, the computer-readable media may include computer-executable instructions that, when executed by the processor(s), perform various functions and/or operations described herein.

In contrast, communication media may embody computer-readable instructions, data structures, program modules, or other data in a modulated data signal, such as a carrier wave, or other transmission mechanism. As defined herein, computer storage media does not include communication media.

The network(s) 104 represents any type of communications network(s), including wire-based networks (e.g., cable), wireless networks (e.g., cellular, satellite), cellular telecommunications network(s), Wi-Fi networks, and IP-based telecommunications network(s). The search service 106 represents a service that may be operated as part of any number of online service providers, such as a search engine, or for applications such as image retrieval, and the like.

The search service 106 may operate in conjunction with a graph application 110 that executes on one or more of the image servers 112(1)-(S). The graph application 110 performs the processes described, such as searching for images similar to an image query 114 by using a codebook 116 that may be generated based at least in part by partitioning a set of data points with a partition module 120, and employing a k-Means approximator module 120, which utilizes a cluster closure module 122, to cluster the data points. For instance, the graph application 110 receives the image query 114 of a Cape Cod style house. The architecture of the Cape Cod style house illustrates the distinct features of the house, such as the steep, pitched roof with end gables, a large chimney in the center, and little ornamentation on the outside, and these features may be used to represent the image of the Cape Cod style house. The graph application 110 performs searches for images having similar features to the steep, pitched roof and the large chimney in the center of the image query 114 by using the codebook 116, which may be book of a bag-of-features image representation. The codebook 116 may be machine-learned by the graph application 110.

In the illustrated example, the search service 106 is hosted on one or more servers, such as the image server(s) 112(1), 112(2), . . . , 112(S), accessible via the network(s) 104. The image servers 112(1)-(S) may be configured as plural independent servers, or as a collection of servers that are configured to perform larger scale functions accessible by the network(s) 104. The image server(s) 112 may be administered or hosted by a network service provider that provides the search service 106 to and from the computing device 102. The search service 106 may be implemented by the image servers 112 and the graph application 110 to and from the mobile device 102.

A database 124 may be a separate server or may be hosted on a representative set of image servers 112 that are accessible via the network(s) 104. The database 124 may store information, such as image collections, image results, hash tables, algorithms to perform the processes described, and the like.

Figure 2:
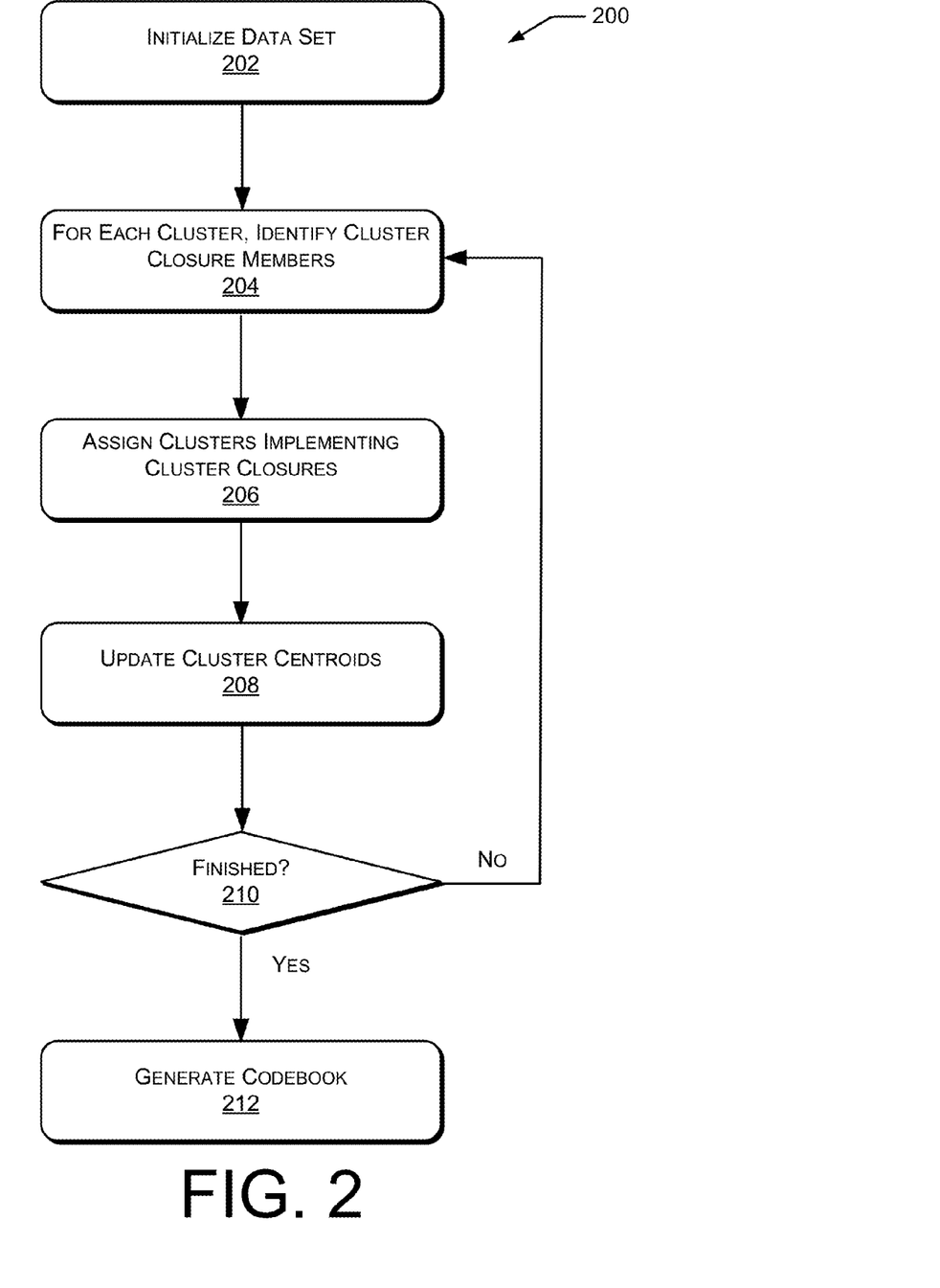
FIG. 2 is a flowchart to illustrate an example process showing functions to be used in the architecture of FIG. 1.
Figure 3:
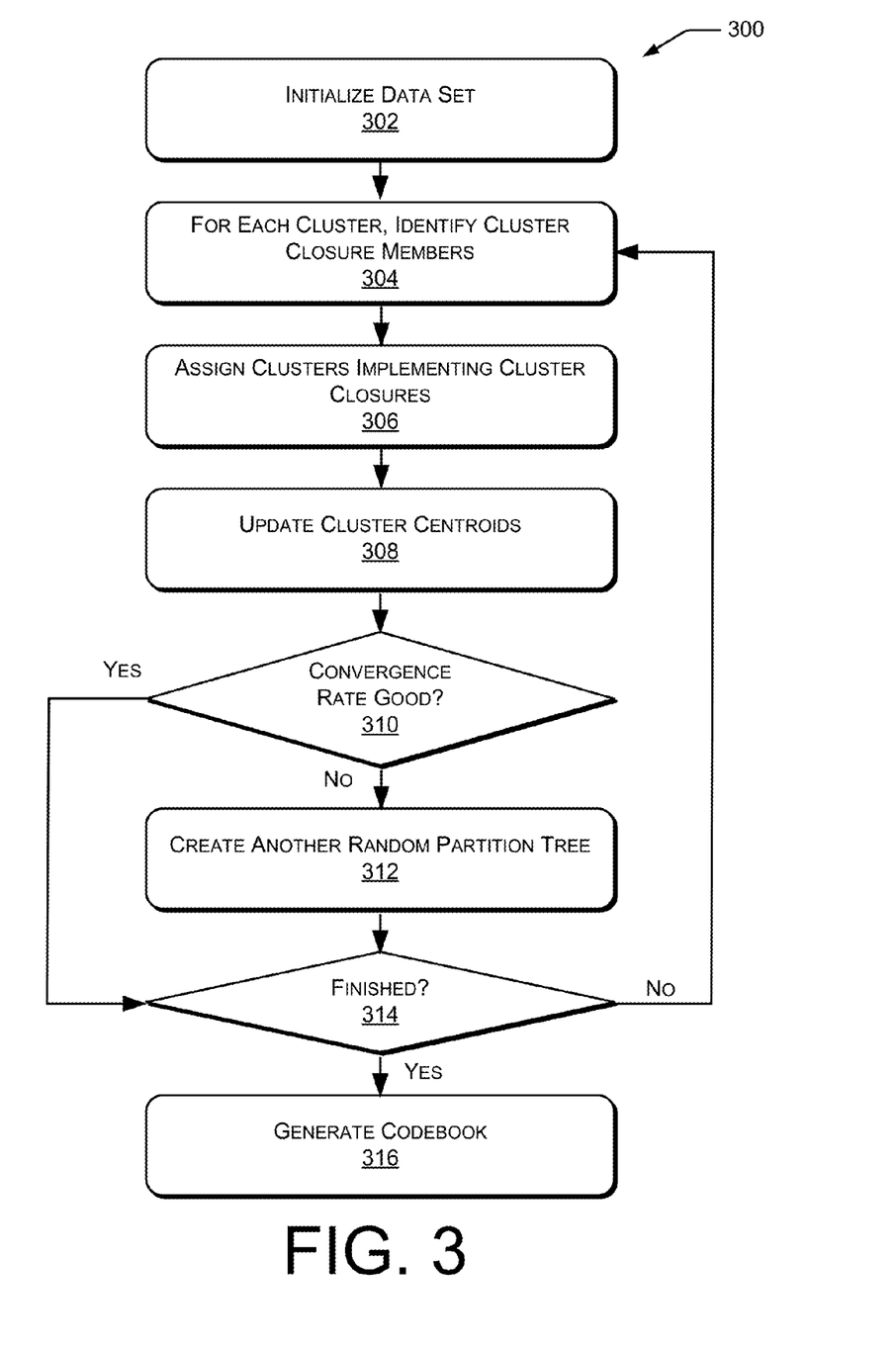
FIG. 3 is a flowchart to illustrate another example process showing functions to be used in the architecture of FIG. 1.

FIGS. 2 and 3 illustrate flowcharts showing example processes. The processes are illustrated as a collection of blocks in logical flowcharts, which represent a sequence of operations that can be implemented in hardware, software, or a combination. For discussion purposes, the processes are described with reference to the computing environment 100 shown in FIG. 1. However, the processes may be performed using different environments and devices. Moreover, the environments and devices described herein may be used to perform different processes.

For ease of understanding, the processes are delineated as separate steps represented as independent blocks in the figures. However, these separately delineated steps should not be construed as necessarily order dependent in their performance. The order in which the processes are described is not intended to be construed as a limitation, and any number of the described process blocks maybe be combined in any order to implement the processes, or alternate processes. Moreover, it is also possible for one or more of the provided steps to be omitted.

FIG. 2 is a flowchart of an example process 200 showing high-level functions performed by the graph application 110 in accordance with one non-limiting embodiment. The process 200 may be divided into multiple phases, and all of the phases may be used in the environment of FIG. 1, may be performed separately or in combination, and without any particular order.

At 202, a data set is acquired and initialized by the graph application 110. The data set may be comprised of n data points, e.g., $\{x_1, x_2, x_3, \ldots x_n\}$, where each data point (x) is a d-dimensional vector. In some instances, a data point may represent an image. The data set may be initialized by the partition module 118 partitioning the data set into multiple groups. In some implementations, every data point $(x_i)$ may be randomly assigned to a cluster $(c_j)$. In other implementations, cluster centroids may be randomly generated and distributed through the space spanning the data set. In some instances, a distance array (D) may be initialized. The elements of the distance array may correspond to data points of the data set, and the elements of the distance array may be set to a predetermined value. In some implementations, the predetermined value may be larger than a largest distance of the space spanning the data set.

At 204, cluster closure members, or active points, are identified for each cluster $(G_j)$ by the graph application 110. In some implementations, a neighborhood set for each data point may be generated by pre-assembling the data points using one or more random partition trees. The cluster closure module 122 may generate a cluster closure by expanding each data point in the cluster into its neighborhood set, as illustrated in FIG. 3.

At 206, data points are assigned to clusters based at least in part on cluster closures by the graph application 110. For each cluster closure $\{\overline{G}_j\}$, the k-Means approximator module 120 may determine the data points (x) contained by the cluster closure $(\overline{G}_j)$, and for each of those data points $(x_i^s \in \overline{G}_j, s=1, 2, \ldots, |\overline{G}_j|)$, the k-Means approximator module 120 may (i) determine the distances between the respective data point and the respective cluster centroids $(c_m)$, and (ii) assign the respective data point to the cluster (G) corresponding to the closest cluster centroid: if $\|x_i^s - c_j^{(t)}\|_2^2 < D[i]$, then $z_i^{(t+1)} = j$, and $D[i] = \|x_i^s - c_j^{(t)}\|_2^2$, where $c_j^{(t)}$ is the cluster centroid of $G_j$ at the $t^{th}$ iteration, $z_i^{(t)}$ denotes the cluster (j) to which the $i^{th}$ data point is assigned at the $t^{th}$ iteration, and i is the global index for x and s is the index into $\overline{G}_j$ for the data point x.

At 208, the k-Means approximator module 120 updates the data points in each cluster, $G_j^{(t+1)} = \{x_i | z_j^{(t+1)} = j\}$, and determines a new cluster centroid for each cluster, $$c_j^{(t+1)} = \frac{1}{|G_j^{(t+1)}|} \sum_{x_i \in G_j^{(t+1)}} x_i.$$

The cluster centroids, $c_j^{(t+1)}$, correspond to the mean of the data points currently assigned to the corresponding updated cluster $G_j^{(t+1)}$.

At 210, the graph application 110 determines whether the clustering process is finished. The graph application 110 may determine that the clustering process has finished based at least in part on number of active points that change clusters in successive iterations. For example, if the number of active points that change clusters in sequential iterations is less than a threshold level, then the graph application 110 may determine that the clustering process is finished.

If negative, the graph application 110 returns to 204 for another iteration If affirmative, the process continues at 212, where the graph application 110 may determine the codebook 116 based at least in part on the set of cluster centroids $C = \{c_1, c_2, c_3, \ldots c_k\}$.

FIG. 3 is a flowchart of another example process 300 showing high-level functions performed by the graph application 110 in accordance with a second non-limiting embodiment.

At 302, a data set is acquired and initialized by the graph application 110. The data set may be comprised of n data points, e.g., $\{x_1, x_2, x_3, \ldots x_n\}$, where each data point (x) is a d-dimensional vector. The partition module 118 may generate one or more random partition trees from the data set, however in some implementations, a single random partition tree is created from the data set. In some implementations, every data point $(x_i)$ may be randomly assigned to a cluster $(c_j)$. In other implementations, cluster centroids may be randomly generated and distributed through the space spanning the data set. In some instances, a distance array (D) may be initialized. The elements of the distance array may correspond to data points of the data set, and the elements of the distance array may be set to a predetermined value. In some implementations, the predetermined value may be larger than a largest distance of the space spanning the data set.

At 304, cluster closure members, or active points, are identified for each cluster ($G_j$) by the graph application 110. The cluster closure module 122 may generate a cluster closure in which members may be identified using one or more existing random partition trees.

At 306, data points are assigned to clusters based at least in part on cluster closures by the k-Means approximator module 120.

At 308, the k-Means approximator module 120 updates the data points in each cluster, $G_j^{(t+1)} = \{x_i | z_j^{(t+1)} = j\}$, and determines a new cluster centroid for each cluster, $$c_j^{(t+1)} = \frac{1}{|G_j^{(t+1)}|} \sum_{x_i \in G_j^{(t+1)}} x_i.$$

At 312, the graph application 110 determines whether the rate of convergence is satisfactory. For example, if the graph application 110 determines that a change to the within-cluster sum of squared distortions (see equation 1) in successive iterations is less than a threshold amount, then the graph application 110 determines that the rate of convergence is unsatisfactory. If affirmative, the clustering process continues at 314. If negative, the clustering process continues at 312.

At 312, the partition module 118 creates another random partition tree from the data set. Increasing the number of existing random partition trees expands the number of active points, and thereby increasing the number of active points that are in a neighborhood of a given data point.

At 314, the graph application 110 determines whether the clustering process is finished. The graph application 110 may determine that the clustering process has finished based at least in part on number of active points that change clusters in successive iterations. For example, if the number of active points that change clusters in sequential iterations is less than a threshold level, then the graph application 110 may determine that the clustering process is finished.

If negative, the graph application 110 returns to 304 for another iteration If affirmative, the process continues at 316, where the graph application 110 may determine the codebook 116 based at least in part on the set of cluster centroids $C = \{c_1, c_2, c_3, \ldots c_k\}$.

Construct Neighborhood $N_x$

Figure 4:
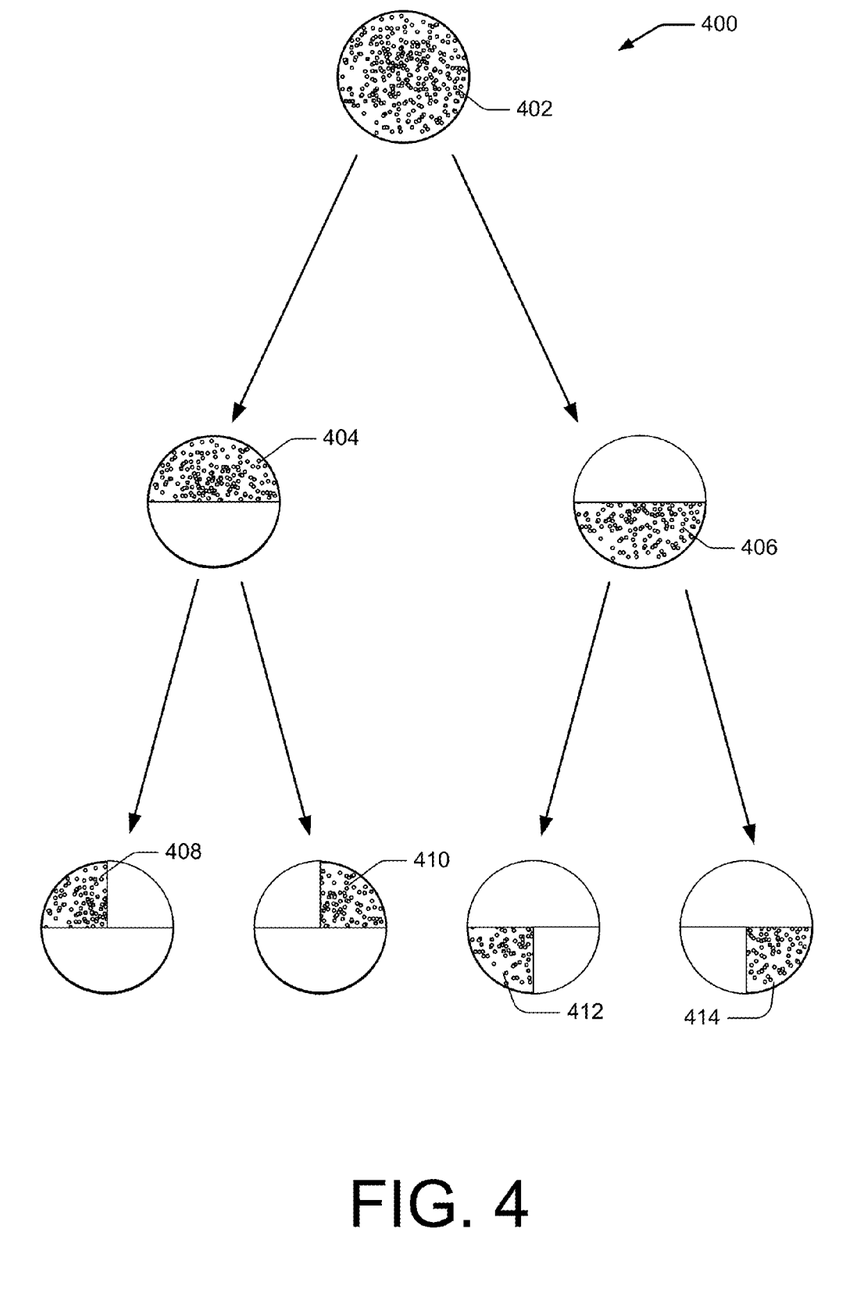
FIG. 4 is a schematic diagram that illustrates constructing an approximate neighborhood.

FIG. 4 is a flowchart illustrating an example process 400 for constructing an approximate neighborhood.

The graph application 110 receives a set of data points 402. The data points may be from a collection of images on a website, images of people, places or things, medical images, fingerprint images, video content, and the like. The set of data points may take many forms, such as video sequences, views from multiple cameras, or multi-dimensional data from a medical scanner. For instance, the set of data points may be represented by $X = \{x_1, x_2, x_n\}$ with $x_i \in R^d$ where $R^d$ represents a d-dimensional Euclidean space.

The partition module 118 partitions the set of data points 402 into subsets 404 and 406. The partition module 118 performs a random division by using a methodology of a hyperplane or a hypersphere to partition the set of data points 402. This process makes nearby data points lie in a same subset. For instance, the partition module 118 divides the set of data points X into two non-overlapping subsets such as, a first set of data points on the top side represented by $X_t$ and a second set of data points on the bottom side represented by $X_b$ to satisfy a criteria that $X_t \cup X_b = X$ and $X_t \cap X_b = \emptyset$.

The partition module 118 may continue to randomly and hierarchically partition the subsets 404 and 406 into subsets further subsets 408-414.

A single approximate neighborhood for each data point (x) can be derived from a random partition (RP) tree, and the final neighborhood may be assembled by combining the results from multiple random spatial partitions. For example, a leaf node (e.g., subset 408) of a single RP tree contains a set of points $V = \{x_j\}$, where the set of points V is a subset of the set of data points 402, and all the points in V may be considered to be mutually neighboring to each other. Thus the neighborhood of a point x in the set V can be straightforwardly computed by $N_x = V$.

Since RP trees are efficient to construct, the above neighborhood computation is also efficient. While a cluster closure from one single RP tree may miss some active points, using multiple RP trees effectively handles this problem. The neighborhoods of x from all the RP trees may be united:

$$N_x = U_l V_l, \quad (4)$$

where $V_l$ is the leaf set from the l-th RP tree that contains the data point x. Note that a data point x may belong to multiple cluster closures. Also note that, in some implementations, the neighborhood of a given data point is computed only once.

Construct Cluster Closure

Figure 5A:
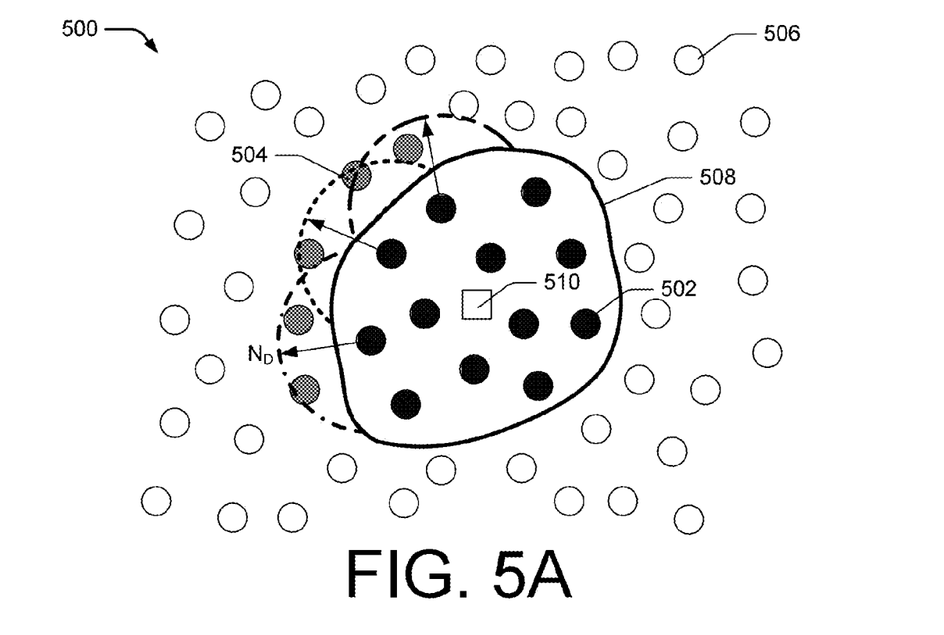
FIGS. 5A and 5B are schematic diagrams that illustrate an example process for constructing a cluster closure.
Figure 5B:
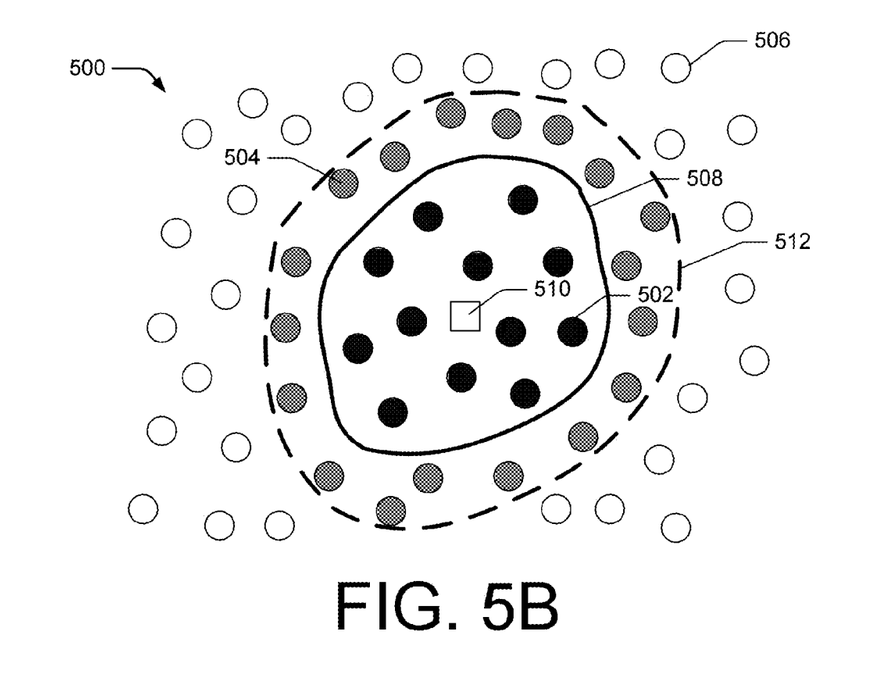

FIGS. 5A and 5B schematically illustrate an example process for constructing a cluster closure.

A set of data points 500 may be conceptualized as being comprised of: assigned data points 502, represented by a solid black circular shape; identified active data points 504, represented by a solid grey circular shape; and non-neighboring data points 506, represented by a solid white circular shape.

A cluster $G_j$ having a boundary 508, which is represented by a solid black line, is comprised of assigned data points 502 during a current iteration. The cluster $G_j$ has a current cluster centroid 510 that is represented by a square shape.

Each one of the identified active data points 504 is within a neighborhood depth ($N_D$) of a given one of the assigned data points 502. For a given assigned data point 502, the cluster closure module 122 may determine whether there exists any of data point that is within the neighborhood depth ($N_D$) of the given assigned data point 502, and if such a data point exists and the data point is not another assigned data point, the cluster closure module 122 may identify the data point as an identified active data point 504. The cluster closure module 122 may utilize one or more random partition trees to locate the data points that are within the neighborhood depth ($N_D$) of a given assigned data point 502. For example, the cluster closure module 122 may partition the set of data points 402 into multiple subsets 408-414 and may regard each data point contained by a given subset as being within the neighborhood depth ($N_D$) of every other data point contained by the given subset. In some implementations, the cluster closure module 122 may locate neighboring data points for all of the assigned data points 502. In other implementations, the cluster closure module 122 may locate neighboring data points for assigned data points 502 that within a threshold distance of the boundary 508.

The union of the assigned data points 502 and all of the identified active data points 504 comprise data points that currently make up a cluster closure ($\overline{G}_j$), represented by the dashed line 512.

For each cluster ($G_j$) of the set of clusters G={$G_1$, $G_2$, $G_3$, ... $G_k$}, the cluster closure module 122 determines a corresponding cluster closure ($\overline{G}_j$) to form a set of cluster closures $\overline{G}$={$\overline{G}_1$, $\overline{G}_2$, $\overline{G}_3$, ... $\overline{G}_k$}. Each cluster closure ($\overline{G}_j$) envelopes an associated cluster ($G_j$) and contains data points of the associated cluster ($G_j$) and data points that neighbor the associated cluster ($G_j$).

At each iteration, the k-Means approximator module 120 may verify whether a data point belonging to a cluster closure ($\overline{G}_j$) should be assigned to the corresponding cluster ($\overline{G}_j$). For each cluster ($G_j$) of the set of clusters G={$G_1$, $G_2$, $G_3$, ... $G_k$}, the k-Means approximator module 120 calculates the distance between the cluster centroid 510 of cluster ($G_j$) and each data point belonging to the cluster closure ($\overline{G}_j$). Whenever a calculated distance between the cluster centroid 510 of cluster ($G_j$) and a given data point is less that a previously calculated distance between the given data point and a cluster centroid for any cluster, the k-Means approximator module 120 updates a corresponding entry in the distance array and assigns the given data point to the cluster ($G_j$).

For example, assume a set of clusters is given by G={$G_1$, $G_2$, $G_3$, ... $G_6$} and the corresponding set of cluster closures is given by $\overline{G}$={$\overline{G}_1$, $\overline{G}_2$, $\overline{G}_3$, ... $\overline{G}_6$} and a given data point is determined to belong to cluster closures $\overline{G}_1$ and $\overline{G}_2$, then the k-Means approximator module 120 calculates the distance between the given data point and the cluster centroid 510 of cluster $G_1$ and the cluster centroid 510 of cluster $G_2$ but does not calculate the distance between the given data point and cluster centroids of other clusters (i.e., $G_3$, $G_4$, $G_5$, $G_6$).

In some embodiments, assigning data points to clusters may be implemented in another way. For each data point x, candidate cluster centroids are computed by checking the cluster memberships $Z_x$ of the data points within the neighborhood of x. In this instance, $Z_x$={z(y)|y∈$N_x$}, and z(y) is the cluster membership of data point y. Then the best cluster candidate for x can be found by checking the clusters {$c_j$|j∈$Z_x$}. In this implementation, the assignments are computed independently and may be computed in parallel. Similarly, the updated cluster centroids (i.e., the mean for each the cluster) may be computed independently and may computed in parallel. Clustering performance in which assignment and updating are performed in parallel is described by Jing Wang, Jingdong Wang, Qifa Ke, Gang Zeng, and Shipeng Li, CVPR '12 Proceedings of the 2012 IEEE Conference on Computer Vision and Pattern Recognition (CVPR), 3037-3044.

Example Server Implementation

Figure 6:
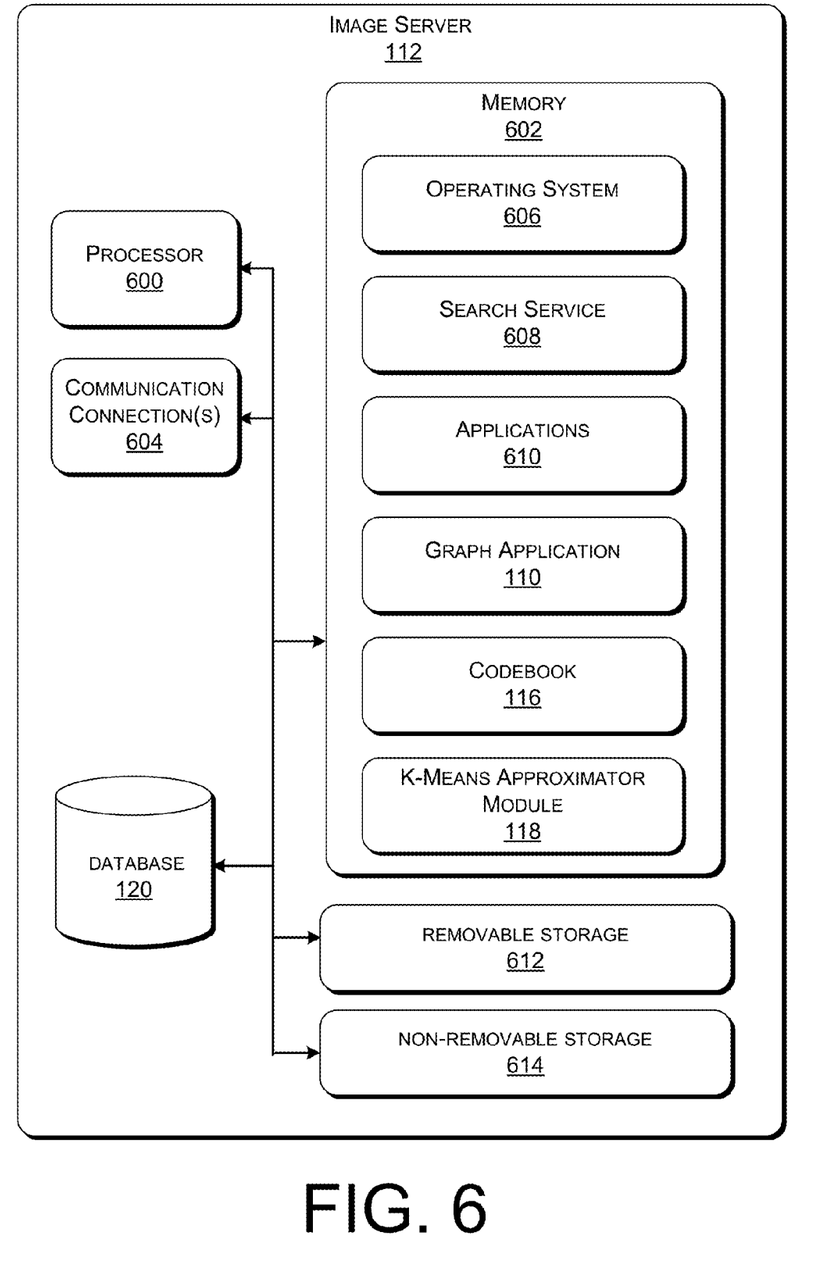
FIG. 6 is a block diagram to illustrate an example server usable with the environment of FIG. 1.

FIG. 6 is a block diagram to illustrate an example server usable with the environment of FIG. 1. The image server 112 may be configured as any suitable system capable of services, which includes, but is not limited to, implementing the search service 106 for image searches, such as providing the search engine to perform the image search. In one example configuration, the image server 112 comprises at least one processor 600, a memory 602, and a communication connection(s) 604. The processor(s) 600 may be implemented as appropriate in hardware, software, firmware, or combinations thereof. Software or firmware implementations of the processor(s) 600 may include computer-executable or machine-executable instructions written in any suitable programming language to perform the various functions described.

In an implementation, a computer-readable storage media stores instructions, that when executed on the processor 600, presents a user interface to receive an image query. The instructions further include generating the codebook 116 based at least on a set of cluster centroids determined by the k-Mean approximator module 120 utilizing the partition module 118 and the cluster closure module 122.

Similar to that of computing environment 100 of FIG. 1, memory 602 may store program instructions that are loadable and executable on the processor(s) 600, as well as data generated during the execution of these programs. Depending on the configuration and type of computing device, memory 602 may be volatile (such as random access memory (RAM)) and/or non-volatile (such as read-only memory (ROM), flash memory, etc.).

The communication connection(s) 604 may include access to a wide area network (WAN) module, a local area network module (e.g., WiFi), a personal area network module (e.g., Bluetooth), and/or any other suitable communication modules to allow the image server 112 to communicate over the network(s) 104.

Turning to the contents of the memory 602 in more detail, the memory 602 may store an operating system 606, a search service module 608, the graph application 110, and one or more applications 610 for implementing all or a part of applications and/or services using the search service 608.

The one or more other applications 610 may include an email application, online services, a calendar application, a navigation module, a game, and the like. The memory 602 in this implementation may also include the graph application 110, the codebook 116, the partition module 118, the k-Means approximator module 120, and the cluster closure module 122.

The graph application 110 may perform the operations described with reference to the figures or in combination with the search service module 608, and/or the partition module 118, the k-Means approximator module 120, and the cluster closure module 122.

The partition module 118, the k-Means approximator module 120, and the cluster closure module 122 may perform the operations separately or in conjunction with the graph application module 110, as described with reference to FIGS. 2-5.

The server 112 may include (or have access to) the database 124 to store images, algorithms, hash table, lists, and the like. Alternatively, this information may be stored on other databases.

The server 112 may also include additional removable storage 612 and/or non-removable storage 614 including, but not limited to, magnetic storage, optical disks, and/or tape storage. The disk drives and their associated computer-readable media may provide non-volatile storage of computer readable instructions, data structures, program modules, and other data for the computing devices. In some implementations, the memory 602 may include multiple different types of memory, such as static random access memory (SRAM), dynamic random access memory (DRAM), or ROM.

The server 112 as described above may be implemented in various types of systems or networks. For example, the server may be a part of, including but is not limited to, a client-server system, a peer-to-peer computer network, a distributed network, an enterprise architecture, a local area network, a wide area network, a virtual private network, a storage area network, and the like.

Various instructions, methods, techniques, applications, and modules described herein may be implemented as computer-executable instructions that are executable by one or more computers, servers, or computing devices. Generally, program modules include routines, programs, objects, components, data structures, etc. for performing particular tasks or implementing particular abstract data types. These program modules and the like may be executed as native code or may be downloaded and executed, such as in a virtual machine or other just-in-time compilation execution environment. The functionality of the program modules may be combined or distributed as desired in various implementations. An implementation of these modules and techniques may be stored on or transmitted across some form of computer-readable media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A method implemented at least partially by a processor, the method comprising:
    constructing a codebook of a set of data points, wherein the codebook comprises a set of cluster centroids of a corresponding set of clusters, wherein each cluster of the set of clusters includes a corresponding subset of the set of data points, each cluster of the set of clusters being defined by a respective cluster boundary, the constructing comprising:
        identifying neighboring data points located within a threshold distance from at least one of a cluster boundary or a data point included in a subset of the set of data points included in a cluster of the set of clusters;
        constructing a cluster closure for each cluster of the set of clusters to create a corresponding set of cluster closures, each cluster closure of the set of cluster closures including a cluster of the set of clusters and an area exterior a respective cluster boundary of the cluster, the area included in each cluster closure and exterior the respective cluster boundary of the respective cluster being within the threshold distance; and
        iteratively assigning at least one neighboring data point of the neighboring data points to one cluster of the set of clusters, the assigning comprising:
            identifying a subset of cluster closures from the set of cluster closures whose areas exterior their respective cluster boundaries include the at least one neighboring data point, wherein the subset of cluster closures includes one cluster closure corresponding to the one cluster, and wherein the subset of cluster closures includes at least two cluster closures and less than all of the set of cluster closures;
            based at least in part on identifying the subset of cluster closures, calculating distances between the at least one neighboring data point and cluster centroids of each cluster corresponding to the subset of cluster closures;
            based at least in part on a comparison of the distances between the at least one neighboring data point and the cluster centroids of each of the subset of cluster closures, assigning the at least one neighboring data point included in the subset of cluster closures to the one cluster; and
        updating a corresponding subset of data points of the one cluster to include the at least one neighboring data point and calculating an updated cluster centroid for the one cluster based at least in part on the updated corresponding subset of data points.

2. The method of claim 1, wherein the identifying the neighboring data points located within the threshold distance from the at least one of the cluster boundary or the data point included in a cluster of the set of clusters comprises partitioning data points of the set of data points.

3. The method of claim 2, wherein the partitioning the data points comprises using a methodology of a random hierarchical binary partition.

4. The method of claim 2, wherein the partitioning the data points comprises recursively dividing the data points into subsets.

5. The method of claim 1, wherein the at least one neighboring data point is not contained by any other cluster closure that is not a member of the subset of cluster closures.

6. The method of claim 1, wherein each of the subset of cluster closures includes a corresponding cluster, at least one of the corresponding clusters comprising the one cluster.

7. The method of claim 1, wherein the assigning the at least one neighboring data point to the one cluster further comprises comparing the distances between the at least one neighboring data point and centroids of the subset of cluster closures to determine a minimum distance, wherein the at least one neighboring data point is assigned to the one cluster corresponding to the minimum distance.

8. The method of claim 6, wherein the corresponding clusters comprise a first subset of clusters corresponding to the subset of cluster closures, wherein the set of clusters is comprised of the first subset of clusters and a second subset of clusters, the first subset and the second subset being non-intersecting, wherein distances between the at least one neighboring data point and cluster centroids are not calculated for any current cluster centroid corresponding to the second subset of clusters.

9. The method of claim 1, further comprising determining the threshold distance based at least in part on one or more random spatial partitions.

10. One or more computer-readable storage media storing instructions that, when executed by a processor, cause one or more processors to perform acts comprising:
    identifying neighboring data points for each data point of a set of data points based at least in part on the neighboring data points being located within a threshold distance from at least one data point of the set of the data points;
    iteratively clustering the set of data points into a set of k-mean clusters, wherein each cluster of the set of k-mean clusters has a corresponding cluster centroid that is an arithmetic mean of data points assigned to each cluster, each cluster of the set of k-mean clusters being defined by a cluster boundary, the clustering comprising:
        constructing a set of cluster closures for the set of k-mean clusters, individual ones of the set of cluster closures being defined by a corresponding cluster closure boundary comprising an area including individual ones of the set of k-mean clusters such that each cluster closure is comprised of data points located interior to the corresponding cluster boundary and neighboring data points located exterior to the corresponding cluster boundary and within the corresponding cluster closure boundary, each cluster closure boundary being located a threshold distance from at least one of the corresponding cluster boundary or a data point of the data points located interior to the corresponding cluster boundary, iteratively assigning a neighboring data point to a cluster of the set of k-mean clusters, the assigning comprising:

identifying a subset of cluster closures of the set of cluster closures whose areas each include a first neighboring data point, the subset of cluster closures each including a respective cluster of the set of k-mean clusters, wherein the subset of cluster closures includes at least two cluster closures and less than all of the set of cluster closures;

based at least in part on identifying the subset of cluster closures, calculating a distance between the first neighboring data point and each of the corresponding cluster centroids of the respective clusters of the subset of cluster closures;

based at least in part on the distances, assigning the first data point to one of the respective clusters; and for each cluster of the set of k-mean clusters, updating a cluster centroid of a corresponding cluster based at least in part on neighboring data points assigned to the corresponding cluster; and generating a codebook based at least in part on a set of cluster centroids, wherein the set of cluster centroids is comprised of updated cluster centroids of the set of k-mean clusters.

11. The computer-readable storage media of claim 10, wherein the acts further comprise:

generating a random partition tree of the set of data points, wherein the random partition tree is comprised of a plurality of leaf nodes, each leaf node corresponds to a subset of the set of data points and is comprised of a corresponding plurality of data points of the set of data points, and wherein for each data point, neighboring data points that are within a neighborhood depth of a respective data point are identified utilizing the leaf nodes of the random partition tree.

12. The computer-readable storage media of claim 11, wherein the acts further comprise:

determining whether a rate of convergence for the clustering of the set of data points exceeds a threshold amount; and performing another iteration of the clustering of the set of data points responsive to the rate of convergence being greater than or equal to the threshold amount.

13. The computer-readable storage media of claim 12, wherein the random partition tree is a first random partition tree, and wherein the acts further comprise:

responsive to the rate of convergence being less than the threshold amount, generating a second random partition tree of the set of data points responsive to the rate of convergence being less than the threshold amount, wherein the second random partition tree is comprised of a plurality of leaf nodes, each leaf node comprised of a corresponding plurality of data points of the set of data points, identifying neighboring data points for each data point utilizing leaf nodes of all of the partition trees, and performing another iteration of the clustering of the set of data points based at least in part on the set of cluster closures identifying neighboring data points for each data point via the leaf nodes of all of the partition trees.

14. The computer-readable storage media of claim 13, wherein the acts further comprise:

determining whether a current rate of convergence for the clustering of the set of data points exceeds the threshold amount;

performing another iteration of the clustering of the set of data points responsive to the current rate of convergence being greater than or equal to the threshold amount; and responsive to the current rate of convergence being less than the threshold amount, generating at least a third random partition tree of the set of data points, wherein the third random partition tree is comprised of a plurality of leaf nodes, each leaf node comprised of a corresponding plurality of data points of the set of data points, identifying neighboring data points for each data point utilizing leaf nodes of all of the first, the second, and the at least third partition trees, and performing another iteration of the clustering of the set of data points based at least in part on the set of cluster closures identifying neighboring data points for each data point via the leaf nodes of all of the first, the second, and the at least third partition trees.

15. The computer-readable storage media of claim 10, wherein the assigning the neighboring data point to a cluster of the set of k-mean clusters includes assigning, in parallel, data points of the set of data points to corresponding clusters of the set of k-mean clusters.

16. The computer-readable storage media of claim 10, wherein the updating the cluster centroid of the corresponding cluster includes updating, in parallel, each corresponding cluster centroid for each cluster of the set of k-mean clusters.

17. A system comprising:

one or more processors; and a memory that includes a plurality of computer-executable components, the plurality of computer-executable components comprising:

a partition module that generates at least one random partition tree having leaf nodes from a set of data points, each leaf node comprised of a subset of the data points;

a cluster closure module configured to generate a set of cluster closures based at least in part on the at least one random partition tree, each cluster closure being defined by a corresponding cluster closure boundary and comprising a cluster closure area including a corresponding cluster of a set of clusters, each cluster of the set of clusters being defined by a cluster boundary and comprising a corresponding plurality of data points of the set of data points, each cluster closure boundary being located a threshold distance from at least one of the corresponding cluster boundary or a data point of the plurality of data points included in the corresponding cluster, and each cluster closure area comprised of neighboring data points located exterior a cluster boundary of a corresponding cluster and within a cluster closure boundary of a corresponding cluster closure;

a k-Means approximator module that assigns a given neighboring data point to a given cluster of the set of clusters based at least in part on:

identifying a subset of cluster closures, from the set of cluster closures, whose cluster closure areas include the given neighboring data point, wherein the subset of cluster closures comprises at least two cluster closures and less than all of the set of cluster closures;

based at least in part on identifying the subset of cluster closures, calculating a distance between the given neighboring data point and a corresponding cluster centroid for each cluster closure in the subset of cluster closures having the given neighboring data point; and based at least in part on the distances between the given neighboring data point and the corresponding cluster centroids for each cluster closure in the subset of cluster closures, assigning the given neighboring data point to the given cluster; and a graph application that generates entries a codebook based at least in part on a set of cluster centroids that corresponds to cluster centroids of the set of clusters, and that compares a received query with the entries in the codebook to provide search results for the received query.

18. The system of claim 17, wherein the k-Means approximator module assigns data points to clusters of the set of clusters in parallel.

19. The system of claim 17, wherein the k-Means approximator assigns the given neighboring point to the given cluster of the set of clusters based at least in part on determining that a distance between the given neighboring data point and a cluster centroid for the given cluster is shorter than distances between the corresponding cluster centroids for each cluster closure in the subset of cluster closures having the given neighboring data point.

* * * * *